(12) United States Patent
Oros (10) Patent No.: US 12,169,040 B1
(45) Date of Patent: Dec. 17, 2024

(54) MECHANICAL PIPE SQUEEZERS AND RELATED METHODS

(71) Applicant: Water Wise, Inc., Victorville, CA (US)

(72) Inventor: Dwayne E. Oros, Victorville, CA (US)

(73) Assignee: Water Wise, Inc., Victorville, CA (US)

( * ) Notice: Subject to any disclaimer, the term of this patent is extended or adjusted under 35 U.S.C. 154(b) by 28 days.

(21) Appl. No.: 18/332,308

(22) Filed: Jun. 9, 2023

(51) Int. Cl.
*F16L 55/10* (2006.01)
*F16K 7/06* (2006.01)

(52) U.S. Cl.
CPC .......... *F16L 55/1018* (2013.01); *F16K 7/063* (2013.01)

(58) Field of Classification Search
CPC ........ F16L 55/1018; F16K 7/063; F16K 7/06; A61M 39/284
See application file for complete search history.

(56) References Cited

U.S. PATENT DOCUMENTS

| | | | | |
|---|---|---|---|---|
| 4,569,502 | A | * | 2/1986 | Elliott ..................... F16K 7/063 251/8 |
| 2011/0098661 | A1 | * | 4/2011 | Jedweb ............... A61M 39/284 604/250 |
| 2011/0314977 | A1 | * | 12/2011 | Lewis ................. A61M 39/284 81/486 |

OTHER PUBLICATIONS

Groebner Powered by Experience, https://www.groebner.com/product/cat-mst1, Mustang—01 Mechanical Squeeze Tool, retrieved Apr. 2023.
DBGA-80 Heavy-Duty Squeeze Tool 8 IPS Dual-Bar, https://squeezetool.com/products-dbga80.php, retrieved Apr. 2023.
GLS-26 Ground Level Squeeze Tool, https://squeezetool.com/products-dbga80.php, retrieved Apr. 2023.
Profiship.us, Wheeler RX Shut Off Tool 3/8"-2" Plastic Water, 75, https://www.profishop.us/wheeler-rex-shut-off-tool-3/8-2-plastic-water-75, retrieved Apr. 2023.

* cited by examiner

*Primary Examiner* — Kelsey E Cary
(74) *Attorney, Agent, or Firm* — Workman Nydegger (57) ABSTRACT

A mechanical pipe squeezer includes: an elongated primary arm having a side surface extending between a first end and an opposing second end; a secondary arm having a side surface extending between a first end and an opposing second end, the first end of the secondary arm being pivotably coupled to the primary arm at a location between the first end and the second end of the primary arm; a threaded passage disposed at the first end of the primary arm; and a threaded shaft having a first end and an opposing second end and being threadedly received within the threaded passage, the second end of the threaded shaft being rotatably coupled to the secondary arm so that rotation of the threaded shaft causes the second end of the secondary arm to either pivot outward away from the primary arm or toward the primary arm, depending on the direction of rotation.

20 Claims, 7 Drawing Sheets

MECHANICAL PIPE SQUEEZERS AND RELATED METHODS

CROSS-REFERENCE TO RELATED APPLICATIONS

Not applicable.

BACKGROUND OF THE INVENTION

1. The Field of the Invention

The present disclosure relates to mechanical pipe squeezers used for squeezing a flexible pipe so as to selectively pinch the pipe closed and related methods.

2. The Relevant Technology

Mechanical pipe squeezers are commonly used for temporarily pinching closed a flexible pipe that contains liquid, such as water, under an elevated pressure or flow rate. By pinching the pipe closed, work can be performed on the pipe downstream of the pipe squeezer without having to deal with the liquid under pressure. Once the work is performed downstream, the pipe squeezer can be removed from the pipe. The flexible pipe then resiliently rebounds to an open position so that the liquid can resume flowing through the pipe.

Although conventional pipe squeezers are functional in pinching flexible pipes closed, they have various shortcomings. For example, a conventional pipe squeezer includes a vertically orientated frame having a horizontally disposed first rod disposed at a lower end of the frame and a horizontally disposed second rod movably disposed at an upper end of the frame. The first rod is fixed to the frame. In contrast, the second rod can selectively move up and away from the first rod or down and toward the first rod by rotation of a shaft that extends vertically up from the second rod and threadedly engages with the frame. To squeeze a pipe closed, the pipe is placed between the first rod and the second rod. The shaft is then rotated so as to force the second rod toward the first rod. The shaft is continuously rotated until the pipe is pinched closed between the first rod and the second rod.

The above pipe squeezer is functional in pinching closed horizontally disposed pipes that are openly disposed but is less useful in pinching closed pipes that extend vertically out of the ground, particularly where the pipe is disposed within a box, such as a meter box or valve box. For example, to use the above pipe squeezer in pinching closed, at ground level, a pipe extending vertically out of the ground, the pipe squeezer must be placed horizontally on the ground so that the pipe can pass up between the first rod and the second rod. In this orientation, however, it can be very difficult to rotate the shaft for squeezing the pipe. This is because the shaft is typically rotated by a T-shaped handle disposed at the end of the shaft. When the pipe squeezer is horizontally disposed on a ground surface, rotation of the outwardly projecting T-shaped handle is obstructed by the ground surface, thereby making it difficult to rotate.

Furthermore, where the vertically extending pipe is disposed within a conventional meter box or valve box, the pipe squeezer is typically too large to fit within the box while in a horizontal orientation. As such, it is often necessary to either remove the box out of the ground, which is labor intensive to remove and replace, or it is necessary to break apart part of the box, which is also labor intensive and can be functionally and aesthetically undesirable. Furthermore, even if the pipe squeezer fits horizontally within the box, the box will typically hinder rotation of the handle. Conventional pipe squeezers are also problematic in that they can require significant effort to operate, i.e., rotate the handle and pinch the pipe closed. In addition, pipe squeezers are subject to high load forces during the pipe squeezing process. Many conventional pipe squeezers are frequently subject to load failure due to poor design and/or lack of durability.

Accordingly, what is needed in the art are pipe squeezers and methods of operation that solve one or more of the above shortcomings or other known shortcomings of convention pipe squeezers.

BRIEF DESCRIPTION OF THE DRAWINGS

Various embodiments of the present disclosure will now be discussed with reference to the appended drawings. It is appreciated that these drawings depict only typical embodiments of the disclosure and are therefore not to be considered limiting of its scope.

DETAILED DESCRIPTION OF THE PREFERRED EMBODIMENTS

Before describing the present disclosure in detail, it is to be understood that this disclosure is not limited to particularly exemplified apparatus, systems, assemblies, methods, or process parameters that may, of course, vary. It is also to be understood that the terminology used herein is only for the purpose of describing particular exemplary embodiments of the present disclosure and is not intended to limit the scope of the disclosure in any manner.

The term "comprising" which is synonymous with "including," "containing," or "characterized by," is inclusive or open-ended and does not exclude additional, unrecited elements or method steps.

It will be noted that, as used in this specification and the appended claims, the singular forms "a," "an" and "the" include plural referents unless the content clearly dictates otherwise. Thus, for example, reference to a "cubby element" includes one, two, or more cubby elements.

As used in the specification and appended claims, directional terms, such as "top," "bottom," "left," "right," "up," "down," "upper," "lower," "proximal," "distal" and the like are used herein solely to indicate relative directions and are not otherwise intended to limit the scope of the disclosure or claims.

Where possible, like numbering of elements have been used in various figures. Furthermore, multiple instances of an element and or sub-elements of a parent element may each include separate letters appended to the element number. For example, two instances of a particular element "10" may be labeled as "10A" and "10B". In that case, the element label may be used without an appended letter (e.g., "10") to generally refer to all instances of the element or any one of the elements. Element labels including an appended letter (e.g., "10A") can be used to refer to a specific instance of the element or to distinguish or draw attention to multiple uses of the element. Furthermore, an element label with an appended letter can be used to designate an alternative design, structure, function, implementation, and/or embodiment of an element. For example, two alternative exemplary embodiments of a particular element may be labeled as "10A" and "10B". In that case, the element label may be used without an appended letter (e.g., "10") to generally refer to all instances of the alternative embodiments or any one of the alternative embodiments.

Various aspects of the present devices and assemblies may be illustrated by describing components that are coupled, attached, and/or joined together. As used herein, the terms "coupled", "attached", and/or "joined" are used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements present. Furthermore, as used herein, the terms "connection," "connected," and the like do not necessarily imply direct contact between the two or more elements.

Various aspects of the present devices, assemblies, and methods may be illustrated with reference to one or more exemplary embodiments. As used herein, the terms "embodiment," "alternative embodiment" and "exemplary embodiment" mean "serving as an example, instance, or illustration," and should not necessarily be construed as required or as preferred or advantageous over other embodiments disclosed herein.

Unless defined otherwise, all technical and scientific terms used herein have the same meaning as commonly understood by one of ordinary skill in the art to which the present disclosure pertains. Although a number of methods and materials similar or equivalent to those described herein can be used in the practice of the present disclosure, the preferred materials and methods are described herein.

Figure 1:
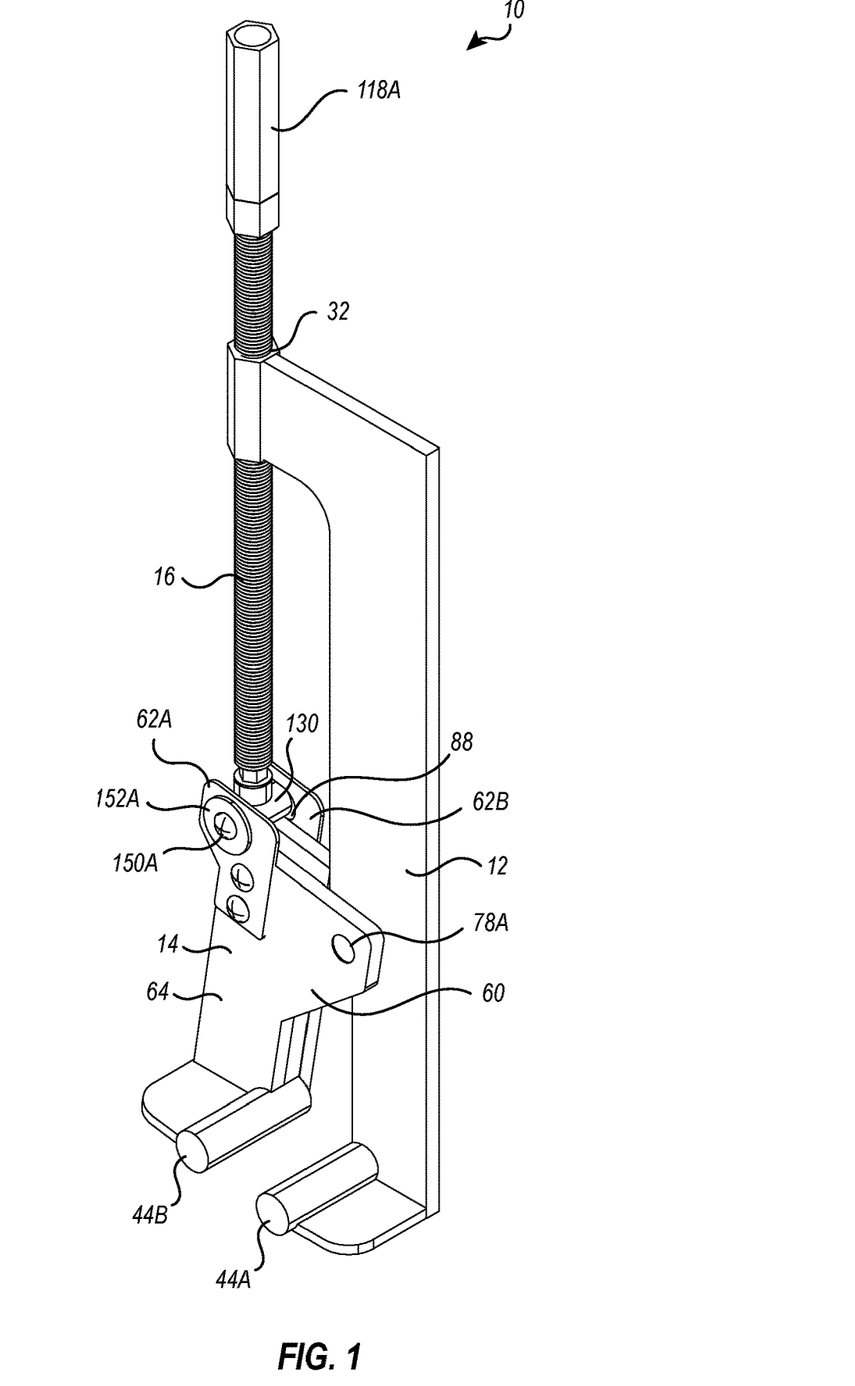
FIG. 1 is a front top perspective view of a mechanical pipe squeezer.
Figure 2:
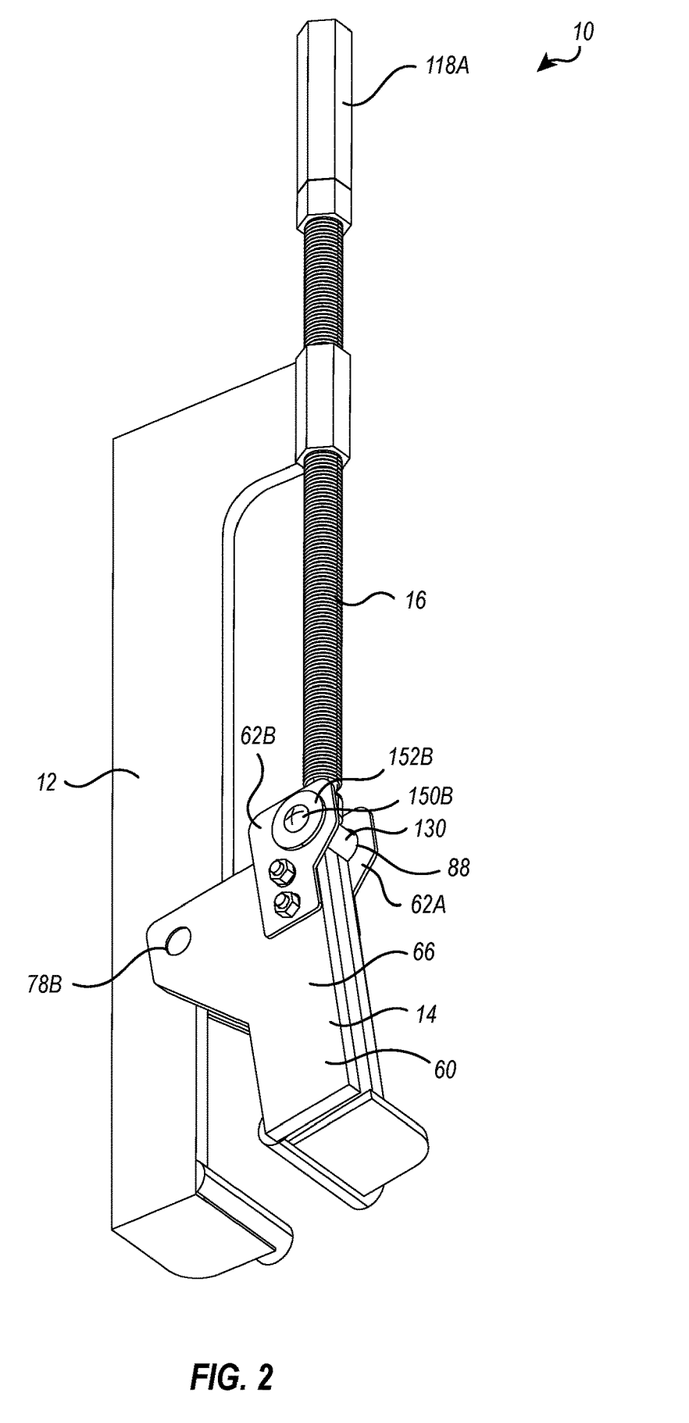
FIG. 2 is a rear bottom perspective view of the pipe squeezer shown in FIG. 1.

Depicted in FIGS. 1 and 2 is a mechanical pipe squeezer 10 configured for selectively squeezing a pipe. Pipe squeezer 10 generally comprises an elongated primary arm 12, a secondary arm 14 that is pivotably coupled to primary arm 12, and a threaded shaft 16. Threaded shaft 16 is rotatably coupled to secondary art 14 and is threadedly coupled to primary 12 such that rotation of threaded shaft 16 relative to primary arm 12 and secondary arm 14 causes secondary arm 14 to either pivot outward away from primary arm 12 to an open position or toward primary arm 12 to a closed position, depending on the direction of rotation.

Figure 3:
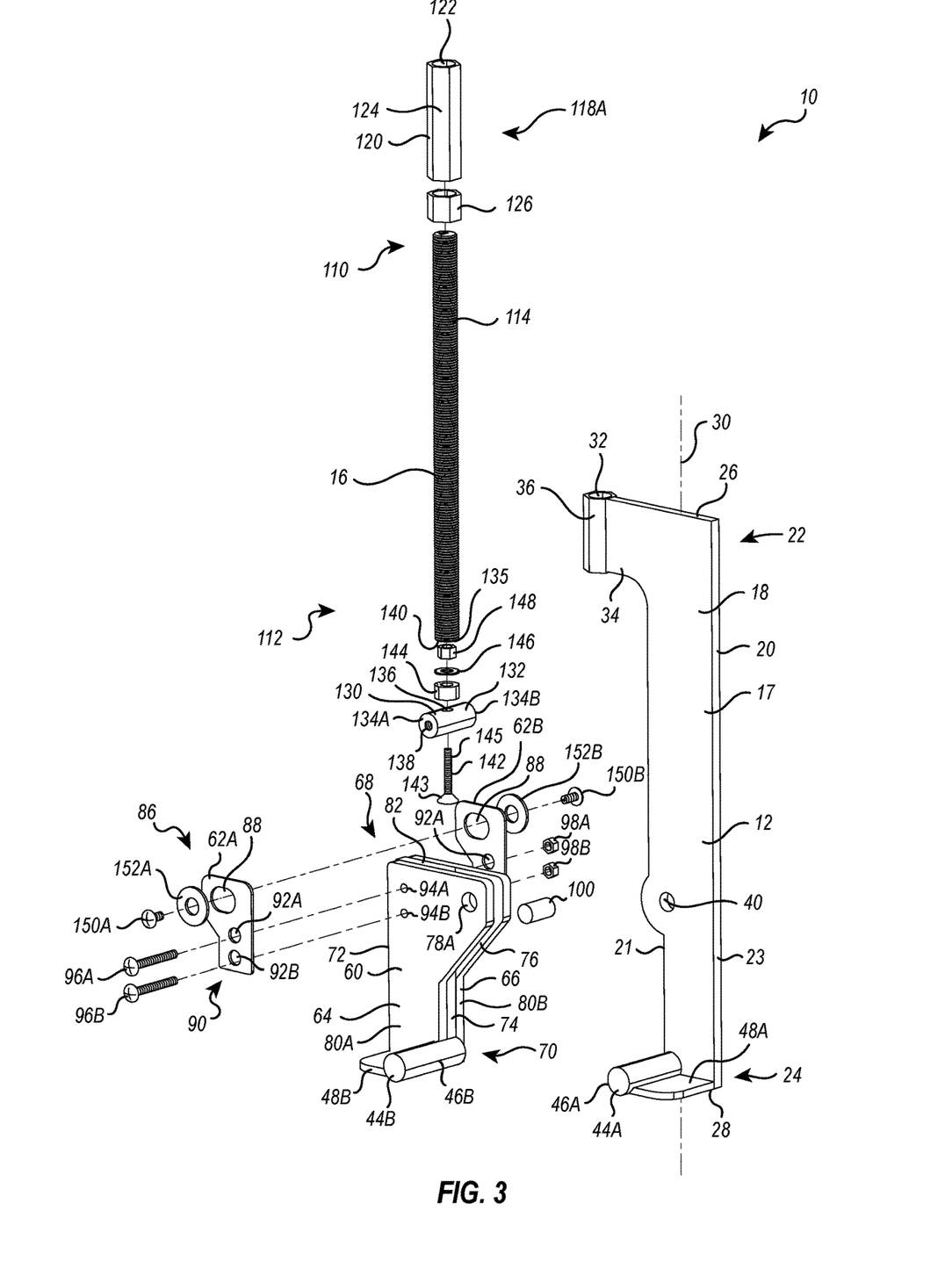
FIG. 3 is an exploded perspective view of the pipe squeezer shown in FIG. 1.

More specifically, in one embodiment as depicted in FIG. 3, primary arm 12 comprises an elongated body 17 having a first side surface 18 and an opposing second side surface 20 that longitudinally extend between a first end 22 and an opposing second end 24. In the depicted embodiment, body 17 is in the form of a plate wherein side surfaces 18 and 20 are flat and disposed in parallel alignment. In this configuration, primary arm 12 also includes an inside edge 21 and an opposing outside edge 23 that extend between first end 22 and opposing second end 24. This configuration provides a low-profile body 17 which can be beneficial in some applications. In alternative embodiments, however, body 17 need not be in the form of a flat plate but can have alternative cross-sectional configurations such as circular, elliptical, polygonal, irregular, or other configurations.

First end 22 terminates at a first end face 26 while second end 24 terminates at a second end face 28. A longitudinal axis 30 longitudinally extends along body 17 so as to pass through end faces 26 and 28. A threaded passage 32 passes through first end 22 of primary arm 12 and is configured to threadedly receive threaded shaft 16. More specifically, in the depicted embodiment, primary arm 12 further comprises an extension 34 that extends laterally from body 17 at first end 22 and a collar 36 is disposed on extension 34. Collar 36 bounds threaded passage 32. Collar 36 can have an exterior surface with flat surfaces 38 formed thereon to better enable engagement with a tool, such as a wrench, for use in holding or securing primary arm 12. For example, collar 36 can have a transverse cross section that is polygonal or has at least two opposing flat surfaces. In alternative embodiments, however, the exterior surface of collar 36 need not have flat surfaces but can have a circular, elliptical, or other rounded cross-sectional configurations. Collar 36 and threaded passage 32 are typically disposed in parallel alignment with longitudinal axis 30. Collar 36 can be integrally formed with extension 34, such as through molding, cutting, or 3-D printing, or can be secured to extension 34 such as by welding or mechanical connection. In other alternative embodiments, collar 36 can be eliminated by simply increasing the thickness of extension 34 and forming threaded passage 32 through extension 34. In other embodiments, extension 34 and/or collar 36 can be eliminated by simply widening body 17 and either forming or mounting collar 36 on the end thereof or increasing the thickness of body 17 and having passage 32 pass therethrough.

An opening 40 passes through primary arm 12/body 17 at a location between first end 22 and second end 24. As discussed below in greater detail, opening 40 is used in pivotably coupling secondary arm 14 to primary arm 12.

Pipe squeezer 10 also includes a first compression member 44A outwardly projecting from second end 24 of primary arm 12/body 17. In one embodiment, first compression member 44A projects orthogonally out from second end 24 of primary arm 12 or orthogonally projects out from first side face 18 of body 17 at second end 24. In other embodiments, first compression member 44A can project out from out from second end 24 of primary arm 12/body 17 so as to form an angle between primary arm 12/body 17 and compression member 44A in a range between 60° and 120° with between 70° and 110° or between 80° and 100° being more common. First compression member 44A has an outside face 46A facing secondary arm 14 that is curved or rounded. For example, in one embodiment, first compression member 44A has a transverse cross section that is circular or comprises a segment of a circle having a radius of at least 0.4, 0.6, 0.8, 1, 1.5 or 2 centimeters (cm). Other dimensions and configurations can also be used. The curvature of first compression member 44A helps to prevent unwanted cutting of the pipe when squeezing, as discussed below.

An optional brace 48A is shown extending from first compression member 44A to primary arm 12/first side surface 18 of body 17. Brace 48A provides reinforcement for first compression member 44A and typically has a thickness less than first compression member 44A. In alternative embodiments, however, brace 48A can be eliminated. In one embodiment, this can be accomplished by simply forming first compression member 44A as a plate having an increased thickness that extends along the width of first side face 18 of body 17 with the inside edge of the plate being curved so as to form outside face 46A. Other configurations can also be used. First compression member 44 and/or brace 48 can be secured to primary arm 12 such as by welding or mechanical fastener. In still other embodiments, first compression member 44 and/or brace 48 can be integrally formed as a single unitary member with primary arm 12, such as through molding, cutting, or 3-D printing of the assembly.

As also depicted in FIG. 3, secondary arm 14 comprises a base 60 having a pair of mounting arms 62A and 62B extending therefrom. Base 60 comprises a first side face 64 and an opposing second side face 66 that longitudinally extend between a first end 68 and an opposing second end 70. Side faces 64 and 66 also extend laterally between an outside face 72 and an inside face 74 that extend between first end 68 and second end 70. Base 60 has a width extending between outside face 72 and inside face 74 wherein the width is wider at first end 68 than at second end 70. A slot 76 is recessed into inside face 74 at first end 74 at first end 68 so as to extend toward outside face 72. A pair of spaced apart mounting holes 94A and 94B pass through base 60 between side face 64 and 66 at or towards first end 68 and towards outside face 72. An opening 78A passes through first side face 64 of base 60 at first end 68 so as to communicate with slot 76 while an opening 78B (FIG. 2) extends through second side face 66 of base 60 in alignment with opening 78A so as to communicate with slot 76. In one embodiment, base 60 can be formed as a single, integral, unitary member, such as by molding, cutting, or 3-D printing.

In alternative embodiments, however, base 60 can be formed from 2, 3, 4, or more separate plates that are secured together. For example, base 60 can be comprised of a first outside plate 80A that includes first side face 64 extending between opposing ends 68 and 70 and having opening 78A extending therethrough and a spaced apart second outside plate 80B having second side face 66 extending between opposing ends 68 and 70 and having opening 78B extending therethrough. A spacer plate 82 is disposed between outside plates 80A and 80B and extends along outside face 72 between opposing end 68 and 70 and is spaced apart from openings 78A and 78B. Spacer plate 82 spaces apart outside plates 80A and 80B so as to form slot 76 therebetween. Plates 80 and 82 can be secured together, such as by welding, adhesive, fasteners, or the like.

Mounting arm 62A has a first end 86 having an elongated guide channel 88 passing therethrough and an opposing second end 90 having a pair of mounting holes 92A and 92B passing therethrough. In the depicted embodiment, mounting arm 62A is in the form of a plate having opposing flat faces through which guide channel 88 and mounting holes 92 pass. In alternative embodiments, however, mounting arm 62A need not be in the form of a plate but can have other configurations. Mounting arm 62B is shown having a configuration identical to mounting arm 62A. As such, like elements between mounting arms 62A and 62B are identified by like reference characters. In addition, all elements and alternatives with regard to mounting arm 62A are also applicable to mounting arm 62B.

Mounting arm 62A and 62B are configured so that they can be disposed on opposing side faces 64 and 66 of base 60, respectively, so that mounting holes 92A and 92B of mounting arm 62A and 62B are aligned with mounting holes 94A and 94B of base 60. Fasteners 96A and 96B can then be passed through aligned mounting holes 92 and 94 so as to securely fix mounting arms 62A and 62B to base 60. In one embodiment, fasteners 96 can comprise bolts to which nuts 98A and 98B are threadedly attached for secure fixed engagement. Other types of fasteners or fastening techniques can also be used to secure mounting arms 62A and 62B to base 60. For example, screws, rivets, clamps, adhesive, welding, or the like, can also be used for securing mounting arms 62A and 62B to base 60. In still other embodiments, mounting arms 62A and 62B can be integrally formed as a single unitary member with base 60 and/or corresponding outside plates 80A and 80B such as by molding, cutting, or 3-D printing. With mounting arms 62A and 62B secured to or formed on base 60, guide channels 88 are typically disposed above first end 68 and/or lateral to inside face 74 so that guide channels 88 are aligned without any obstruction by base 60.

Pipe squeezer 10 also includes a second compression member 44B outwardly projecting from second end 70 of secondary arm 14 or second end 70 of base 60. In one embodiment, second compression member 44B projects orthogonally out from second end 70 of secondary arm 14/base 60. In other embodiments, second compression member 44B can project out from second end 70 of secondary arm 14/base 60 so as to form an angle between secondary arm 14/base 60 and compression member 44B in a range between 60° and 120° with between 70° and 110° or between 80° and 100° being more common. Second compression member 44B has an outside face 46B facing towards primary arm 12 and, more specifically, toward outside face 46A of first compression member 44. Outside face 46B is curved or rounded. For example, in one embodiment, second compression member 44B has a transverse cross section that is circular or comprises a segment of a circle having a radius of at least 0.4, 0.6, 0.8, 1, 1.5 or 2 centimeters (cm). Other dimensions and configurations can also be used. Compression members 44A and 44B typically have a longitudinal length of at least or less than 2, 4, 6, 8, 10, or 12 cm or in a range between any two of the foregoing values. Other dimensions can also be used.

An optional brace 48B is shown extending from second compression member 44B to secondary arm 14/base 60. Brace 48B provides reinforcement for second compression member 44B and typically has a thickness less than second compression member 44B. In alternative embodiments, however, brace 48B can be eliminated. In one embodiment, this can be accomplished by simply forming second compression member 44B as a plate having an increased thickness that extends along the width of base 60 with the inside edge of the plate begin curved so as to form outside face 46B. Other configurations can also be used. In one embodiment, second compression member 44B can have the same configuration as first compression member 44A.

During assembly, primary arm 12/body 17 is received within slot 76 of secondary arm 14 so that opening 40 of primary arm 12 aligns with openings 78B and 78B of secondary arm 14. A shaft 100 is then passed through aligned openings 40 and 78A and 78B so as to pivotably secure secondary arm 14 to primary arm 12. Shaft 100 can have a variety of different configurations. For example, in one embodiment, shaft 100 can comprise a pin that is press fit into opening 78A and 78B but is smaller than opening 40 on primary arm 12. As such, the pin/shaft 100 can freely rotate within opening 40 of primary arm 12 while being securely held to secondary arm 14. In other embodiments, shaft 100 can comprise a bolt, rivet, or any other type of shaft that can be secured to secondary arm 14 so as to enable secondary arm 14 to pivot relative to primary arm 12.

Continuing with FIG. 3, threaded shaft 16 longitudinally extends between a first end 110 and an opposing second end 112. Threaded shaft 16 has one or more threads 114 helically extending around shaft 14 along at least the portion of the length extending between first end 110 and second end 112. Threads 114 are configured to threadedly engage with threaded passage 32. A handle 118A is mounted at first end 110 of threaded shaft 16. In the depicted embodiment, handle 118A comprises a tubular collar 120 that bounds a threaded passage 122. Threaded passage 122 is configured to threadedly receive first end 110 of threaded shaft 16. Collar 120 typically has two or more flats 124 formed on an exterior surface thereof so that collar 120 can be easily engaged by a wrench or other tool for rotation. In one embodiment, collar 120 can have a transverse cross section having a polygonal configuration. This configuration can also permit a socket to be placed over the free terminal end of collar 120 so that handle 118A and associated threaded shaft 16 can be rotated by a wrench, a tool socket with corresponding ratchet, a tool socket with corresponding impact gun, or other conventional tools that engage a polygonal head. A locking nut 126 can also be threaded onto threaded shaft 16 below collar 120 and subsequently tightened against collar 120 so as to securely hold collar 120 on threaded shaft 16. In other embodiments, locking nut 126 can be eliminated by securing collar 120 to threaded shaft 16 such as through welding or an adhesive. In other embodiments, handle 118A can be integrally formed with threaded shaft 16 at first end 110 such as through molding, cutting, or 3-D printing. In this case, threaded passage 122 can be eliminated.

Figure 4:
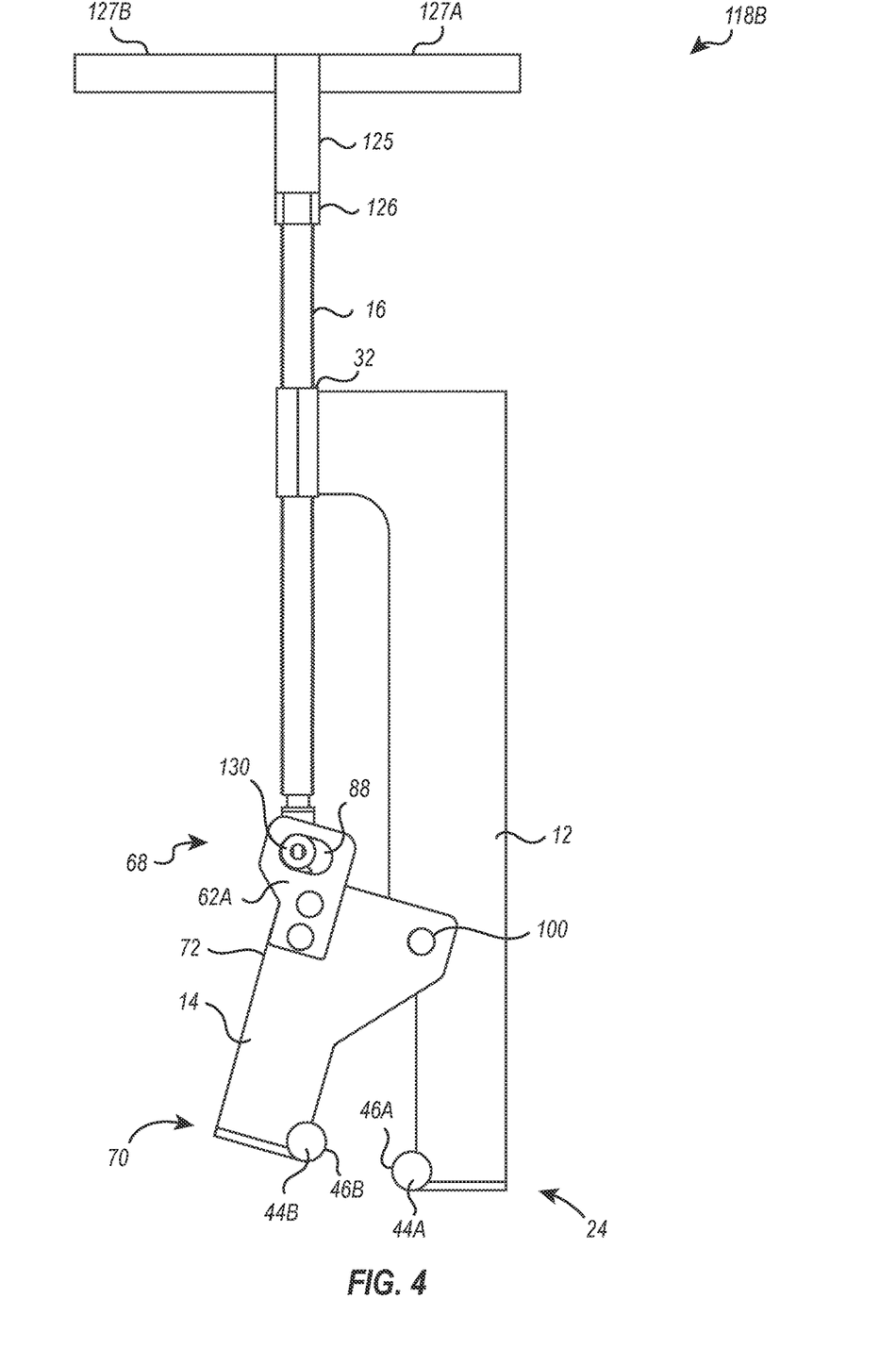
FIG. 4 is an elevated front view of the pipe squeezer shown in FIG. 1 partially disassembled and in an open position.
Figure 5:
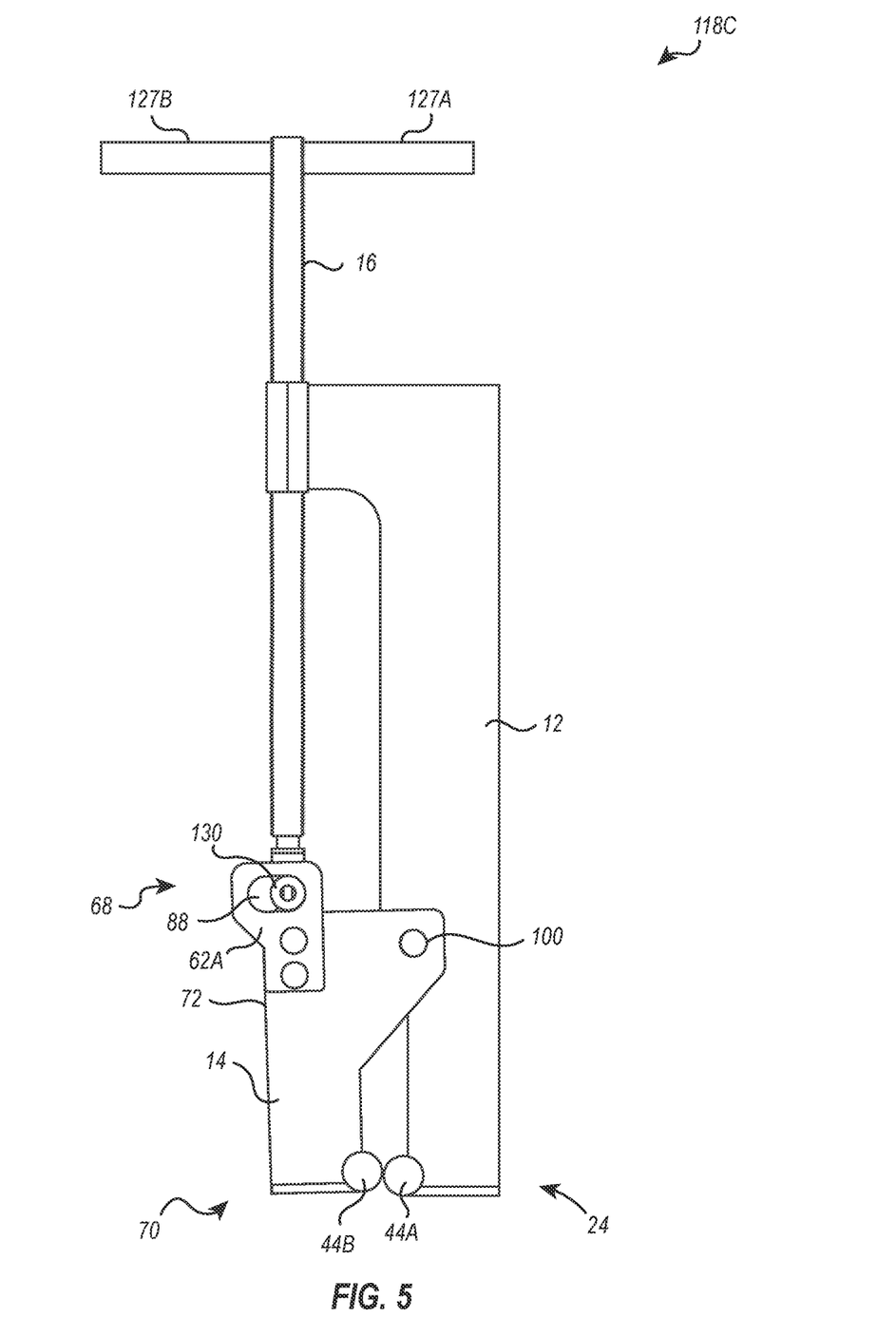
FIG. 5 is an elevated front view of the pipe squeezer shown in FIG. 4 in a closed position.

In alternative embodiments, handle 118A can have a variety of alternative configurations that enable manual rotation of threaded shaft 16. For example, as depicted in FIG. 4, a handle 118B has a stem 125 having a pair of arms 127A and 127B outwardly projecting therefrom in opposing directions so as to have a T-shaped configuration. Stem 125 can be mounted on threaded shaft 16 or integrally formed therewith. In FIG. 5, a further alternative handle 118C is shown. In this embodiment, handle 118C simply comprises arms 127A and 127B outwardly projecting from opposing sides of threaded shaft 16. Arms 127A and 127B can be integrally formed with or mounted on threaded shaft 16, such as by welding. In other embodiments, arms 127A and 127B can be formed by passing a single rod through an opening extending through threaded shaft 16 so that the opposing ends of the rod form arms 127A and 127B. Other conventional handle configurations for rotating threaded shaft 16 can also be used. Handles 118A, 118B, 118C, and other conventional handles that can be used are herein generally referred to as handle 118.

Returning to FIG. 3, second end 112 of threaded shaft 16 to rotatably coupled to first end 68 of secondary arm 14. The rotational attachment of threaded shaft 16 to secondary arm 14 can be accomplished in a variety of different ways. In the depicted embodiment, a cylindrical pin 130 is provided having an encircling side wall 132 that extends between opposing end faces 134A and 134B. An opening 136 passes laterally through side wall 132 at a central location between end faces 134A and 134B. Each end face 134A and 134B is provided with a threaded opening 138. Second end 112 of threaded shaft 16 terminates at an end face 135 having a recessed hole 140 formed thereat. In one embodiment, pin 130 is coupled to threaded shaft 16 by passing a fastener 142 through opening 136 in pin 130 and then securing fastener 142 to second end 112 of threaded shaft 16. Fastener 142 secures pin 130 to threaded shaft 16 while still enabling threaded shaft 16 to rotate relative to pin 130. In one specific embodiment, fastener 142 comprises an enlarged head 143 having a threaded stem 145 extending therefrom, such as in the form of a bolt or screw. During assembly, stem 145 of fastener 142 is passed through opening 136 in pin 130, through a thrust washer 144, through a flat washer 146, and through a locking nut 148 (by threaded engagement therewith) and is then threaded into hole 140 on threaded shaft 16. Locking nut 148 can then be rotated, such as through the use of a wrench, so as to advance locking nut 148 along stem 145 and tighten locking nut 148 against terminal end face 135 of threaded shaft 142, thereby securely fixing fastener 142 to threaded shaft 16. Opening 136 of pin 130 is larger than the diameter of stem 145 so that pin 130 can freely rotate about stem 145. However, enlarged head 143 is larger than opening 136 of pin 130 so as to prevent pin 130 from sliding off of fastener 142. In one embodiment, enlarged head 143 is tapered and fits within a corresponding countersink formed as part of opening 136. As a result, the terminal end of enlarged head 143 can be flush with or recessed into the exterior surface of pin 130 so as to help avoid being an obstruction.

In the above configuration, rotation of threaded shaft 16, such as through the use of handle 118, facilitates the concurrent rotation of threaded shaft 16 with locking nut 148 and fastener 142. However, pin 130 can remain stationary during the rotation of threaded shaft 16. Thrust washer 144 and flat washer 146 are optional but can help facilitate smooth rotation of threaded shaft 16 and locking nut 148 relative to pin 130. In the assembled configuration, a longitudinal axis of pin 130 can extend orthogonal to a longitudinal axis of threaded shaft 16.

It is appreciated that a variety of alternative configurations can be used to couple pin 130 to threaded shaft 16 so that threaded shaft 16 can freely rotate relative to pin 130. For example, in one embodiment locking nut 148 can be eliminated and fastener 142 can be securely fixed to second end 112 of threaded shaft 16 through the use of adhesive, welding, press fit connection, a secure threaded engagement, or the like. In another alternative, fastener 142 can be eliminated and replaced with a stem having a reduced diameter and outwardly projecting from end face 135 at second end 112 of threaded shaft 16. The stem can be integrally formed with or otherwise secured to threaded shaft 16. The stem is passed through opening 136 on pin 30 and an enlarged head, such as locking nut 148, is then secured at the end thereof. In this configuration, pin 30 can freely rotate about the stem but is retained thereon by the enlarged head. Other mounting configurations can also be used.

As depicted in FIGS. 1-3, pin 130 is received within guide channels 88 of mounting arm 62A and 62B. A fastener 150A passes through a washer 152A and is threaded into opening 138 at end face 134A of pin 130 while a fastener 150B is passed through a washer 152B and is threaded into opening 138 at end face 134B of pin 130. Washers 152A and 152B are larger than guide channels 88 and assist in retaining the opposing ends of pin 130 within guide channels 88. Fasteners 150 and washers 152 are optional and can be eliminated by increasing the length of pin 130 to ensure that it cannot escape from guide channels 88.

In one embodiment, primary arm 12, secondary arm 14, threaded shaft 16, and compression members 44 are made of metal, such as steel or aluminum, so as to have desired strength properties. The use of metal can be helpful in ensuring that pipe squeezer 10 will not fail during operation and will have the desired durability. However, depending on the application and the forces that will be applied to pipe squeezer 10, the parts of pipe squeezer 10 can also be made of other materials such as plastic or composite. In some embodiments, different parts can be made of different materials.

In the above assembled configuration, rotation of threaded shaft 16, such as through the use of handle 118, causes secondary arm 14 to either pivot outward away from primary arm 12 to an open position or toward primary arm 12 to a closed position, depending on the direction of rotation. More specifically, with reference to FIG. 4, second end 70 of secondary arm 14 is shown pivoted outward and away from second end 24 of primary arm 12 so that pipe squeezer 10 is in the open position. In the open position, compression members 44A and 44B are spaced apart so that a pipe for squeezing can be placed therebetween. To move pipe squeezer 10 to the closed position, as depicted in FIG. 5, threaded shaft 16 is rotated, such as through the use of handle 118, so that the threaded engagement between threaded shaft 16 and collar 36/threaded passage 32 causes threaded shaft 16 to advance relative to primary arm 12 toward secondary arm 14. Handle 118 can be rotated manually or through the use of one of the tools previously discussed. Threaded shaft 16 rotates relative to pin 130 which is retained within guide channels 88 of secondary arm 14/mounting arms 62A and 62B.

As threaded shaft 16 is advanced toward secondary arm 14, pin 130 pushes against secondary arm 14/mounting arms 62A at a location adjacent to outside face 72 which causes secondary arm 14 to pivot about shaft 100. In turn, second end 70 of secondary arm 14 is moved toward second end 24 of primary arm 12. The advancement of threaded shaft 16 can continue until pipe squeezer 10 is in the closed position as shown in FIG. 5. Specifically, in one embodiment, threaded shaft 16 can be rotated and advanced until secondary arm 14 pivots relative to primary arm 12 so that compression member 44B is biasing against compression member 44A. More specifically, curved/rounded outside face 46B of compression member 44B biases against curved/rounded outside face 46A of compression member 44A.

To move pipe squeezer 10 back to the open position, threaded shaft 16 is rotated in the opposite direction so that threaded shaft 16 advances away from secondary arm 14. As threaded shaft 16 advances away from secondary arm 14, pin 130 retained within guide channels 88 pulls against secondary arm 14/mounting arms 62A at a location adjacent to outside face 72 which causes secondary arm 14 to pivot about shaft 100 so that compression member 44B is drawn away from compression member 44A and into the open position, as shown in FIG. 4.

As also depicted in FIGS. 4 and 5, guide channels 88 are elongated or otherwise enlarged so that pin 130 can freely slide laterally within guide channels 88 as pipe squeezer 10 is moved between the open and closed positions. That is, as pipe squeezer 10 moves from the open position in FIG. 4 to the closed position in FIG. 5, first end 68 of secondary arm 14 pivots outward away from primary arm 12. To enable secondary arm 14 to freely pivot, guide channels 88 are sufficiently enlarged so that pin 130 can freely slide laterally in a first direction within guide channels 88 as secondary arm 14 is pivoted between the open position and the closed position. In turn, pin 130 can also freely slide laterally in an opposite second direction within guide channels 88 as secondary arm 14 is pivoted between the closed position and the open position. Unless some other modification is made, failure to enlarge guide channels 88 relative to pin 130 can result in pin 130 preventing the desired pivoting of secondary arm 14 relative to primary arm 12. (Fastener 150A and washer 152A are hidden in the assembly shown in FIGS. 4 and 5 to enable easy visualization of the movement of pin 130 within guide channels 88 as pipe squeezer 10 is moved between the open and closed position.)

In view of the foregoing, during use pipe squeezer 10 is moved to the open position as shown in FIG. 4. Pipe squeezer 10 is then manipulated so that an open pipe is positioned between spaced apart compression members 44A and 44B. Threaded shaft 16 is then rotated so as to begin moving pipe squeezer 10 into the closed position. As pipe squeezer 10 is moved toward the closed position, the pipe is compressed between compression members 44A and 44B. Pipe squeezer 10 is continued to be moved toward the closed positioned until the pipe is squeezed or pinched closed between outside face 46B of compression member 44B and outside face 46A of compression member 44A. The pivoting of secondary arm 14 creates a mechanical advantage that assists in the squeezing of the pipe.

Depending on the application, the pipe can need to be squeezed or pinched closed so that it does not leak when a select fluid pressure is produced inside of the pipe. In other applications, the pipe may have an internal fluid pressure at the time the pipe is placed between compression members 44A and 44B. Pipe squeezer 10 can then be used to squeeze or pinch the pipe closed so as to prevent or at least limit fluid flow past the location where the pipe is squeezed or pinched closed. This enables free operation on the pipe downstream of where the pipe is squeezed or pinched closed without interference of the fluid under the elevated pressure. For example, such operations can include repairing or replacing valves, meters, connectors, connections, pipe sections, or the like. Pipe squeezer 10 can also be used in pressure testing of the pipe upstream of pipe squeezer 10. The rounding of outside faces 46 of compression member 44 both helps prevent unwanted cutting or damage to the pipe while also providing an increased surface area over which the opposing sides of the pipe can be sealed together.

Once the desired operation or testing of pipe upstream or downstream of pipe squeezer 10 is completed, pipe squeezer 10 can be moved to the open position, as discussed above, and separated from the pipe. The pipe will then either independently and/or under an applied fluid pressure, return to an open position that allows fluid to pass therethrough. It is appreciated that pipe squeezer 10 is typically used with flexible piping or tubing, as is known in the art, that can be pinched closed by pipe squeezer 10 without fracture, breaking, or other type of failure and will typically at least partially elastically rebound to an open position when pipe squeezer 10 is removed.

Figure 6:
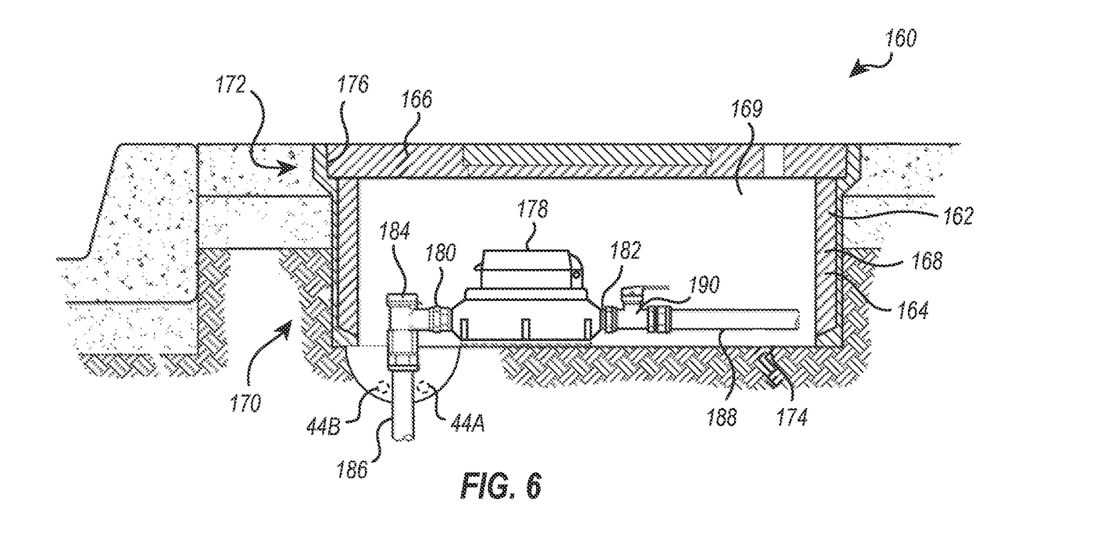
FIG. 6 is cross sectional side view of a water meter coupled with piping on which the pipe squeezer of FIG. 1 can be used.

Depicted in FIG. 6 is one common application of where pipe squeezer 10 can be used. Specifically, FIG. 6 shows a typical water meter service installation 160 for a building such as a residence, office, industrial building, or the like. Water meter service installation 160 includes a meter box 162 having a box housing 164 with a lid 166. More specifically, box housing 164 includes an encircling sidewall 168 that bounds a compartment 169 extending between a lower end 170 and an opposing upper end 172. Sidewall encircles a lower opening 174 that communicates with compartment 169 at lower end 170 and an upper opening 174 that communicates with compartment 169 at upper end 172. Lid 166 is removably mounted on box housing 164 to selectively cover upper opening 174. Box housing 164 is typically buried in ground 177 up to upper end 172. Disposed within compartment 169 is a water meter 178 having an inlet opening 180 and an outlet opening 182. Water meter 178 measures and designates the volume of water that flows therethrough.

Coupled to inlet opening 180 of water meter 178 is a valve 184 that can be manipulated to selectively stop the flow of water to water meter 178. Coupled to valve 184 is a water service line 186. Water service line 186 comprises a flexible pipe that is coupled to a buried water main (not shown) and delivers water from the water main, through valve 184 and to water meter 178. Valve 184 is typically at least partially disposed within compartment 169 of meter box 162 while water service line 186 passes up from within the ground below meter box 162 to couple with valve 184. In one embodiment, water service line 186 can extend vertically as it couples with valve 184. Water service line 186 can also pass through lower opening 174 and couple with valve 184 within compartment 169 or can couple with valve 184 below meter box 162.

Coupled to outlet opening 182 of water meter 178 is a customer service line 188 that extends to a building (not shown), such as discussed above, for delivering water to the building. In one embodiment, a customer valve 190 can be disposed between outlet opening 182 of water meter 178 and customer service line 188. Customer valve 190 is typically disposed within compartment 169, if used.

On occasion, valve 184 will break, fail to operate properly, or otherwise need to be replaced. Turning off the water pressure to valve 184 can be very difficult without turning off the water to an entire neighborhood or neighborhoods. However, pipe squeezer 10 can be used in the replacement of valve 184 without turning off the water. For example, lid 166 is removed and, as needed, dirt is removed from below valve 184 to expose a section of water service line 186. Pipe squeezer 10 is moved to the open position, as discussed above, and lowered down through upper opening 176. Pipe squeezer 10 can be vertically orientated while lowering into opening 176. Alternatively, pipe squeezer 10 can be orientated so that a longitudinal axis of threaded shaft 16 is disposed at an angle between +/−30° relative to vertical as compression members 44A and 44B are advanced into compartment 169.

Pipe squeezer 10 is then manipulated so that compression members 44A and 44B are disposed on opposing sides of water service line 186 while the remainder of pipe squeezer 10 projects upward, typically vertically upward, so as to project out through upper opening 176. In this orientation, handle 118 is freely disposed outside of compartment 169 and can be easily accessed and rotated. Handle 118 is rotated until pipe squeezer 10 is sufficiently moved to the closed compression that water service line 186 is pinched closed between members 44A and 44B. With water service line 186 pinched closed, valve 184 can be removed and replaced. Once valve 184 is replaced, pipe squeezer 10 can be moved to the open position, thereby again permitting water to freely flow from water service line 186 through valve 184 and water meter 178 and to the building. Pipe squeezer 10 can also be used in a variety of other applications where it is desired to squeeze or pinch a pipe closed.

In view of the foregoing, it is appreciated that pipe squeezer 10 has a number of unique benefits. For example, pipe squeezer 10 is uniquely adapted for squeezing pipe vertically extending out of a ground surface. This is because compression members 44A and 44B can be easily positioned on opposing sides of the vertically extending pipe while pipe squeezer 10 remains vertically orientated. Because pipe squeezer 10 is retained vertically orientated, handle 118 can be easily rotated because it is not obstructed by the ground and because it is elevated so as to be easily accessed by the operator. Furthermore, because pipe squeezer 10 remain vertically orientated while squeezing a vertically orientated pipe, the end of pipe squeezer 10 can be easily fit within a valve box or meter box housing the pipe, thereby avoiding the need to remove or at least partially break about the box. In addition, because pipe squeezer 10 operates by pivoting secondary arm 14 during squeezing of the pipe, pipe squeezer 10 uses a mechanical advantage when squeezing the pipe, thereby limiting operator effort. Pipe squeezer 10 is also advantages in that it can also be used for temporarily squeezing closed flexible residential and commercial gas pipelines. Finally, in one embodiment, pipe squeezer 10 is also uniquely configured so that individual parts can be easily removed and replaced. As a result, pipe squeezer 10 can be easily and inexpensively repaired and maintained. Other advantages also exist.

Figure 7:
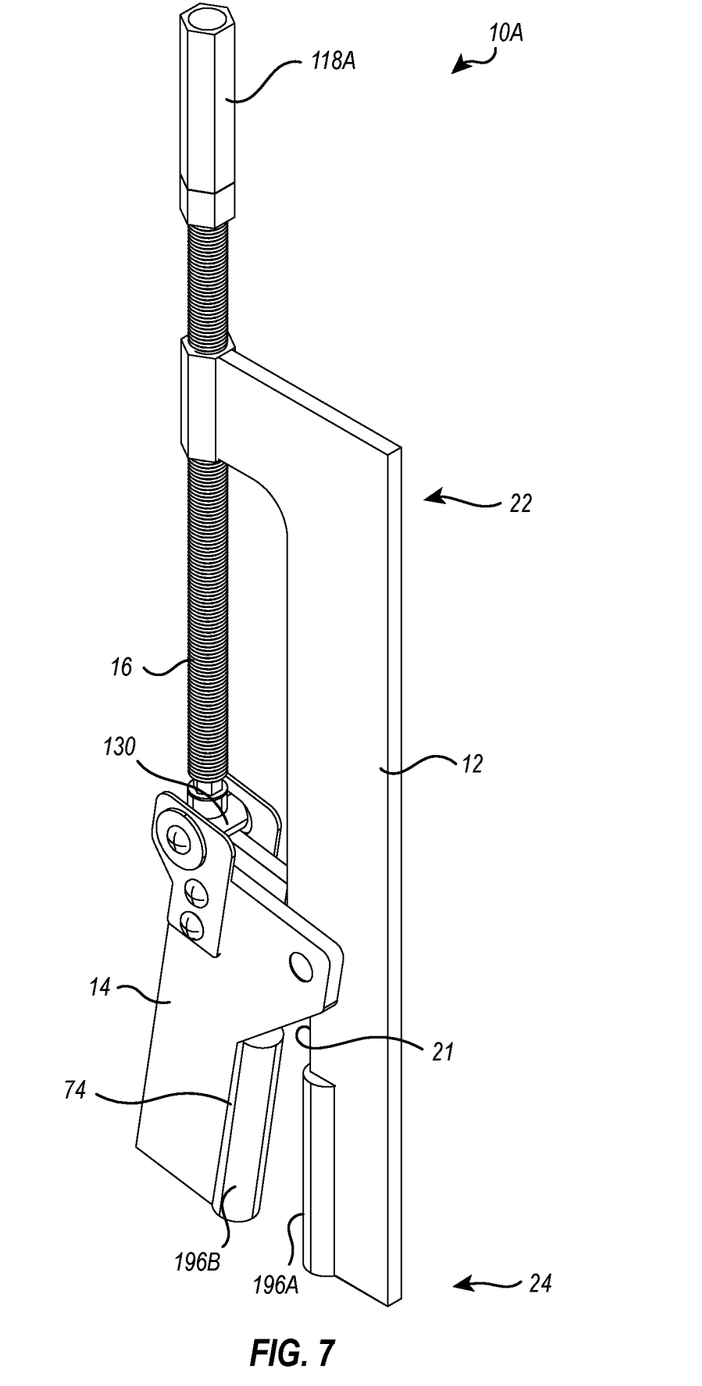
FIG. 7 is a front perspective view of an alternative embodiment of the pipe squeezer shown in FIG. 1.

It is appreciated that pipe squeezer 10 can have a variety of other configurations. For example, depicted in FIG. 7 is an alternative embodiment of a pipe squeezer 10A. It is appreciated that pipe squeezer 10A is substantially the same as pipe squeezer 10. As such, except as noted below, all of the above disclosure regarding pipe squeezer 10, including the elements, alternatives, functions, and operations, are also applicable to pipe squeezer 10A and like elements are identified by like reference numbers. For example, pipe squeezer 10A includes primary arm 12, secondary arm 14, threaded shaft 16, threaded passage 32, and pin 130 rotatably coupled to threaded shaft 16 and secured to secondary arm 14. Pipe squeezer 10A differs from pipe squeezer 10 in that it does not include compression member 44A outwardly projecting from primary arm 12 or compression member 44B outwardly projecting from secondary arm 14. Braces 48A and 48B are also excluded. Rather, pipe squeezer 10A includes a compression member 196A disposed along inside edge 21 of primary arm 12 at second end 24 and a compression member 196B disposed along inside face 74 of secondary arm 14/base 60 at second end 70 that faces compression member 196A.

Compression member 196A has a curved or rounded outside face 198A while compression member 196B has a curved or rounded outside face 198B facing outside face 198A. In one embodiment, compression members 196A and 196B each have a transverse cross section that is circular or comprises a segment of a circle having a radius of at least 0.4, 0.6, 0.8, 1, 1.5 or 2 centimeters (cm). Other dimensions and configurations can also be used. Again, the curvature of compression members 196A and 196B helps to prevent unwanted cutting or damage to a pipe during the squeezing process. Compression members 196A and 196B can be formed by simply rounding inside edge 21 of primary arm 12 at second end 24 and inside face 74 of secondary arm 14/base 60 at second end 70. Alternatively, a rounded member, such as a section of a cylindrical rod, can be secured or integrally formed along inside edge 21 of primary arm 12 and inside face 74 of secondary arm 14/base 60.

During use, pipe squeezer 10A is moved to the open position so that compression members 196A and 196B are spaced apart. A pipe for squeezing is then placed between compression members 196A and 196B. Pipe squeezer 10A is then moved toward the closed position, as discussed above, until the pipe is sufficiently squeezed between compression members 196A and 196B as to pinch or squeeze the pipe closed. The configuration of pipe squeezer 10A makes it easier for an operator to squeeze a pipe that is horizontally or generally horizontally disposed while the configuration of pipe squeezer 10 makes it easier for an operator to squeeze a pipe that is vertically or generally vertically disposed. Pipe squeezer 10 can also have other configurations.

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems, processes, and/or products according to certain embodiments of the present disclosure may include, incorporate, or otherwise comprise properties features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative assemblies, processes, products, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

What is claimed is:

1. A mechanical pipe squeezer comprising:
    an elongated primary arm having a side surface extending between a first end and an opposing second end;
    a secondary arm having a side surface extending between a first end and an opposing second end, the first end of the secondary arm being pivotably coupled to the primary arm at a location between the first end and the second end of the primary arm;
    a threaded passage disposed at the first end of the primary arm;
    a threaded shaft having a first end and an opposing second end and being threadedly received within the threaded passage, the second end of the threaded shaft being rotatably coupled to the secondary arm so that rotation of the threaded shaft causes the second end of the secondary arm to either pivot outward away from the primary arm to an open position or toward the primary arm to a closed position, depending on a direction of rotation;
    a first compression member outwardly projecting from the side surface of the primary arm at the second end of the primary arm, the first compression member outwardly projecting as a cantilever so as to only be supported at one end thereof; and
    a second compression member outwardly projecting from the side surface of the secondary arm at the second end of the secondary arm, the second compression member outwardly projecting as a cantilever so as to only be supported at one end thereof, the first compression member being aligned with the second compression member when the secondary arm is pivoted to the closed position.

2. The mechanical pipe squeezer as recited in claim 1, wherein the first compression member outwardly projects from the side surface of the primary arm as a cantilever by a distance of at least 4 cm.

3. The mechanical pipe squeezer as recited in claim 1, wherein the first compression member outwardly projects orthogonally from the side surface of the primary arm.

4. The mechanical pipe squeezer as recited in claim 1, wherein the first compression member and the second compression member each have a curved outside face having a radius of at least 3 mm, the curved outside face of the first compression member and the curved outside face of the second compression member biasing against each other when the secondary arm is in the closed position.

5. The mechanical pipe squeezer as recited in claim 1, further comprising:
    a pin rotatably coupled to the second end of the threaded shaft, the pin having longitudinal axis that extends orthogonal to a longitudinal axis of the threaded shaft; and
    the secondary arm having an elongated first guide channel extending through a first portion thereof and an elongated second guide channel extending through a second portion thereof, the pin being received within the first guide channel and the second guide channel so that the pin moves longitudinally along the first guide channel and the second guide channel as the secondary arm is moved between the open position and the closed position.

6. The mechanical pipe squeezer as recited in claim 5, wherein the threaded shaft is disposed between the first portion and the second portion of the secondary arm.

7. The mechanical pipe squeezer as recited in claim 1, further comprising a handle disposed at the first end of the threaded shaft.

8. The mechanical pipe squeezer as recited in claim 1, wherein the secondary arm comprises a first plate, a second plate, and a spacer disposed between the first plate and the second plate.

9. The mechanical pipe squeezer as recited in claim 8, further comprising:
    a first mounting arm secured to the first plate and having a first elongated guide channel passing therethrough;

a second mounting arm secured to the second plate and having a second elongated guide channel passing therethrough; and a pin rotatably coupled to the second end of the threaded shaft, the pin having a longitudinal axis that extends orthogonal to a longitudinal axis of the threaded shaft, the pin being slidably received within the first elongated guide channel and the second elongated guide channel.

10. The mechanical pipe squeezer as recited in claim 1, further comprising a first compression member disposed on the primary arm and a second compression member disposed on the secondary arm, the first compression member and the second compression member each have a curved outside face that face each other.

11. A method for squeezing a pipe using the mechanical pipe squeezer as recited in claim 1, the method comprising:
    placing the pipe between the primary arm and the secondary arm; and
    rotating the threaded shaft so to pivot the secondary arm toward the primary arm so that the pipe is squeezed between the secondary arm and the primary arm.

12. A method for squeezing a pipe using the mechanical pipe squeezer as recited in claim 1, the method comprising:
    placing the pipe between a first compression member outwardly projecting from the primary arm and a second compression member outwardly projecting from the secondary arm; and
    rotating the threaded shaft so to pivot the secondary arm toward the primary arm so that the pipe is squeezed between the first compression member and the second compression member.

13. A method for squeezing a pipe located within a compartment of a housing using a mechanical pipe squeezer, the mechanical pipe squeezer comprising:
    an elongated primary arm having a side surface extending between a first end and an opposing second end;
    a secondary arm having a side surface extending between a first end and an opposing second end, the first end of the secondary arm being pivotably coupled to the primary arm at a location between the first end and the second end of the primary arm;
    a threaded passage disposed at the first end of the primary arm;
    a threaded shaft having a first end and an opposing second end and being threadedly received within the threaded passage, the second end of the threaded shaft being rotatably coupled to the secondary arm so that rotation of the threaded shaft causes the second end of the secondary arm to either pivot outward away from the primary arm to an open position or toward the primary arm to a closed position;
    a first compression member outwardly projecting from the side surface of the primary arm at the second end of the primary arm; and
    a second compression member outwardly projecting from the side surface of the secondary arm at the second end of the secondary arm,
the method comprising:
    advancing the first compression member and the second compression member into the compartment of the housing so that the first compression member and the second compression member are disposed on opposing sides of the pipe and the first end of the threaded shaft is disposed outside of the housing; and
    rotating the first end of the threaded shaft disposed outside of the housing so that the secondary arm pivots toward the primary arm and the pipe is squeezed between the first compression member and the second compression member.

14. The method as recited in claim 13, wherein the pipe is a water pipe having water therein under an elevated pressure and wherein squeezing the pipe between the first compression member and the second compression member precludes passage of the water through the pipe.

15. The method as recited in claim 13, further comprising replacing a valve coupled
    to the pipe after the pipe is squeezed between the first compression member and the second compression member, the valve being disposed within the housing.

16. The method as recited in claim 13, orientating the mechanical pipe squeezer so that a longitudinal axis of the threaded shaft is disposed at an angle between +/−30° relative to vertical as the first compression member and the second compression member are advanced into the compartment.

17. A mechanical pipe squeezer comprising:
    an elongated primary arm having a side surface extending between a first end and an opposing second end;
    a secondary arm having a side surface extending between a first end and an opposing second end, the first end of the secondary arm being pivotably coupled to the primary arm at a location between the first end and the second end of the primary arm;
    a threaded passage disposed at the first end of the primary arm;
    a threaded shaft having a first end and an opposing second end and being threadedly received within the threaded passage, the second end of the threaded shaft being rotatably coupled to the secondary arm so that rotation of the threaded shaft causes the second end of the secondary arm to either pivot outward away from the primary arm to an open position or toward the primary arm to a closed position, depending on a direction of rotation;
    a pin rotatably coupled to the second end of the threaded shaft, the pin having longitudinal axis that extends orthogonal to a longitudinal axis of the threaded shaft; and
    the secondary arm having an elongated first guide channel extending through a first portion thereof and an elongated second guide channel extending through a second portion thereof, the pin being received within the first guide channel and the second guide channel so that the pin moves longitudinally along the first guide channel and the second guide channel as the secondary arm is moved between the open position and the closed position.

18. The mechanical pipe squeezer as recited in claim 17, wherein the threaded shaft is disposed between the first portion and the second portion of the secondary arm.

19. A mechanical pipe squeezer comprising:
    an elongated primary arm having a side surface extending between a first end and an opposing second end;
    a secondary arm having a side surface extending between a first end and an opposing second end, the first end of the secondary arm being pivotably coupled to the primary arm at a location between the first end and the second end of the primary arm, the secondary arm comprising a first plate, a second plate, and a spacer disposed between the first plate and the second plate;
    a threaded passage disposed at the first end of the primary arm; and a threaded shaft having a first end and an opposing second end and being threadedly received within the threaded passage, the second end of the threaded shaft being rotatably coupled to the secondary arm so that rotation of the threaded shaft causes the second end of the secondary arm to either pivot outward away from the primary arm to an open position or toward the primary arm to a closed position, depending on a direction of rotation.

20. The mechanical pipe squeezer as recited in claim 19, further comprising:
   a first mounting arm secured to the first plate and having a first elongated guide channel passing therethrough;
   a second mounting arm secured to the second plate and having a second elongated guide channel passing therethrough; and
   a pin rotatably coupled to the second end of the threaded shaft, the pin having a longitudinal axis that extends orthogonal to a longitudinal axis of the threaded shaft, the pin being slidably received within the first elongated guide channel and the second elongated guide channel.

* * * * *